United States Patent
Cazeneuve et al.

(10) Patent No.: US 8,215,584 B2
(45) Date of Patent: Jul. 10, 2012

(54) AIRCRAFT STRUCTURE INCLUDING STIFFENER EDGE JUNCTIONS

(75) Inventors: Helene Cazeneuve, Plaisance du Touch (FR); Bruno Cacciaguerra, Les Nolles (FR); Jean-Claude Lacombe, Blagnac (FR); David Andissac, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 266 days.

(21) Appl. No.: 12/738,600

(22) PCT Filed: Sep. 12, 2008

(86) PCT No.: PCT/FR2008/051631
§ 371 (c)(1),
(2), (4) Date: Jun. 29, 2010

(87) PCT Pub. No.: WO2009/050358
PCT Pub. Date: Apr. 23, 2009

(65) Prior Publication Data
US 2010/0264272 A1     Oct. 21, 2010

(30) Foreign Application Priority Data
Oct. 18, 2007    (FR) ..................................... 07 58423

(51) Int. Cl.
*B64C 1/06* (2006.01)
(52) U.S. Cl. ..................... 244/131; 244/119; 244/120

(58) Field of Classification Search .................. 244/131, 244/117 R, 119, 120, 123.1
See application file for complete search history.

(56) References Cited

U.S. PATENT DOCUMENTS

| 5,518,208 | A | 5/1996 | Roseburg | |
| 2006/0060705 | A1 | 3/2006 | Stulc et al. | |
| 2010/0258676 | A1* | 10/2010 | Gauthie et al. | 244/131 |
| 2011/0042519 | A1* | 2/2011 | Tacke et al. | 244/131 |

FOREIGN PATENT DOCUMENTS

| EP | 1719698 A | 11/2006 |
| WO | 2006001859 A | 1/2006 |

OTHER PUBLICATIONS

International Search Report dated Apr. 27, 2009.

* cited by examiner

*Primary Examiner* — Tien Dinh
*Assistant Examiner* — Jamie S Stehle
(74) *Attorney, Agent, or Firm* — Perman & Green, LLP

(57) ABSTRACT

An aircraft structure including stiffened panels assembled at the junction, without continuity of the stiffeners. Multiple panels are used to form the fuselage, tail units and wings of an aircraft. These panels include stiffeners which are interrupted at each panel junction. However, the stresses experienced by the stiffeners must be transmitted despite these interruptions. Known solutions require the use of at least one additional part per stiffener and per interruption. In order to solve this problem, the disclosed embodiments include a doubler necessitating at most one additional part per panel junction area for all of the interrupted stiffeners in this area.

10 Claims, 7 Drawing Sheets

AIRCRAFT STRUCTURE INCLUDING STIFFENER EDGE JUNCTIONS

CROSS-REFERENCE TO RELATED APPLICATIONS

This application is the National Stage of International Application No. PCT/FR2008/051631 International Filing Date, 12 Sep. 2008, which designated the United States of American, and which International Application was published under PCT Article 21 (s) as WO Publication No. WO2009/050358 A2 and which claims priority from, and the benefit of, French Application No. 200758423 filed on 18 Oct. 2007, the disclosures of which are incorporated herein by reference in their entireties.

BACKGROUND

The aspects of the disclosed embodiments relate to the field of structures comprising stiffened panels. This relates to panel essentially comprised of a thin coating, whose structural stability is ensured by elements relating to the coating.

More particularly, the disclosed embodiments relate to structures in which the stiffened panels, such as those used for producing the aircraft fuselage, are assembled at the junction of said panels without stiffener continuity.

For explanatory purposes regarding the state of art relating to the assembly of stiffened panels, such as, for example, one embodiment of the disclosed embodiments, the case of the assembly of stiffened panels aimed at producing an aircraft fuselage shall be described.

An aircraft fuselage is typically found in so-called "hull" structures, in particular for reasons related to lighter masses, which are essential in the field of aeronautics. On conventional aircraft, the fuselage comprises one substantially constant section on one part of its length, which gives the fuselage an overall well-known cylindrical shape.

For industrial and logistic reasons, such a fuselage is often produced from multiple cylindrical sections or from multiple section panels according to the type of assembly provided for by the industrial process. When the fuselage is produced from multiple sections, each section can itself be comprised of multiple panels.

In order to produce a rigid but light-weight structure, the hull structures generally comprise a relatively thin coating located on the inner wall of the cylinder. This coating is also referred to as skin. The hull structures also comprise structural elements attached to said coating, aimed at ensuring both the resistance and stability of said structures. In one aircraft fuselage structure, the structural elements substantially directed in the direction of the fuselage cylinder generators are referred to as stiffeners. The structural elements located on a substantially normal plane to said generators are referred to as frames.

With aircraft and for aerodynamic reasons, the stiffeners and frames and generally located inside the fuselage, and are therefore attached to the coating, itself located on the inner wall of the sections of fuselage.

When the panels are assembled to form a section or a fuselage, these panels are generally already equipped with stiffeners. The stiffeners therefore stop at the edges of the panel located on the same side as the stiffener ends, said panel edges being referred to, by extension, as panel ends. These panels comprised of a coating and stiffeners, are referred to as self-stiffened panels.

During the assembly operation for the sections or panels in order to produce a fuselage, the stresses in the coating and stiffeners must be transmitted from one section to the other or from one panel to the other. This refers in particular to tensile, compressive and/or shearing stresses.

In order to ensure the transfer of these stresses, one solution consists in creating coating and stiffener continuity at the level of a panel junction. This continuity is obtained by means of junction parts, on the one hand from panel to panel, and on the other hand from stiffener to stiffener. Said junction parts are produced in such a way as to preserve a transversal cross-section and constant inertia over the entire length of the structure.

One method generally used consists in attaching a plate to the coating of the two panels, said plate taking on the curve of the panels and partially covering the two panels positioned end to end. When the fuselage is assembled in sections, each plate, referred to as shroud, covers all or part of the fuselage perimeter at the level of the junction.

In order to create a connection between two stiffeners located opposite each other at the level of the junction, a specific part, referred to as a batten, is attached between the two stiffeners. A batten has a cross-section generally similar to that of the stiffeners concerned by the junction and covers each stiffener over a long enough distance to efficiently transmit the stresses from one stiffener to the other.

One of the difficulties connected to this type of junction is due to the poor alignment of the stiffeners that must be assembled at the level of a junction.

The unavoidable provisions regarding the dimensions of the stiffeners and their positions on the coatings, connected to the panel manufacturing and assembly methods, do not guarantee the precise alignment of the stiffeners between the two panels or the two sections being assembled.

One known solution consists in not attaching the stiffeners to the coatings over their entire length. A long enough length is left free at the ends of said stiffeners that must be battened. After having positioned the panels to be assembled, the stiffeners can thus be distorted within the limits of their field of elasticity, in order to align them before completing their assembly to the panels and batten.

This solution therefore requires particular assembly operations and cannot be performed in situations where the stiffeners are attached over their entire length, as, for example, with welded or bonded stiffeners, in particular in the case of structures made out of composite materials.

In these cases, the panels must be produced with very strict dimensional tolerances. This solution is limited to large-scale dimensions and always turns out to be very expensive. The alignment faults can also be corrected with blocks. The implementation of said blocks is a delicate and long procedure, requiring, when using a polymerisable mastic, a waiting time detrimental to the duration of the assemblies.

In addition, some stiffener shapes, particularly used in structures made out of composite materials, have closed cross-sections. Once assembled with a panel, the inside of the stiffener can no longer be accessed. This is the general case for stiffeners comprising two sole plates and a body connecting said two sole plates. These stiffeners are referred to as omega-shaped stiffeners due to their characteristic cross-section with a shape similar to a capital omega ($\Omega$).

Without any possibility of inspecting the inside of such stiffeners, attachments are not recommended for unblocking the inside of these stiffeners.

Moreover, in some instances, the junction is produced in the presence of a reinforcing frame. In these cases, in order to ensure the passage of battens from one end of the stiffener to the other, openings must be made through the reinforcing frame. These openings reduce the level of structural resistance of the reinforcing frame. In addition, the presence of the frame significantly increases the complexity of the batten assembly operations and that of the section assembly operations.

SUMMARY

The disclosed embodiments offer a solution to resolving these difficulties in the prior art. The purpose of the disclosed embodiments is therefore to enable structures such as an aircraft fuselage to be simply and quickly manufactured and installed with these interrupted stiffeners. Another purpose of the disclosed embodiments is to enable the stresses to be efficiently transmitted, despite the interruptions in the stiffeners.

Moreover, the purpose of the disclosed embodiments is to avoid blind attachments, i.e. to avoid attachments that open up the inside of stiffeners with closed cross-sections, such as omega-shaped stiffeners. Another purpose of the disclosed embodiments is to provide junctions that do not require openings to be created within the frame.

In order to resolve these problems, the disclosed embodiments provide for the presence of a doubler. The purpose of a doubler is to lower the stress of the stiffener towards the coating or skin of the panel. In order to enable the progressive transfer of the stresses, the stiffeners are progressively interrupted. Such a doubler thus unloads the stiffeners so that the stiffener is almost completely free from stress at the level of the interruption of said stiffener, and that the shroud is sufficient in transmitting the stress from one panel to the other.

The disclosed embodiments aim at reducing the "level of stiffening" via the progressive interruption of the stiffeners. According to the disclosed embodiments, the stiffeners are systematically widened in the junction area. This enables the misalignments to be absorbed and to guarantee the presence of enough material between the attachments and the edges of the parts for the efficient transmission of the stresses.

The disclosed embodiments have multiple modes of embodiment, in particular at the level of the doubler. The doubler can be an additional part bonded above the skin, battened above the skin, or integrated underneath the skin of the panel. According to another mode of embodiment, the role of the doubler can be performed by the presence of an additional level of thickness of the skin underneath the stiffeners, or the doubler can even be integrated into the shroud. In a similar manner, the stiffener sole plates can be widened in order to touch each other and perform the role of the doubler, or even in some cases, no doubler could be used with a right-hand or toothed shroud.

The disclosed embodiments therefore relate to an aircraft structure comprising a first stiffened panel, said first panel comprising a skin and at least one stiffener, the stiffener of the first panel comprising at least two sole plates attached to one side of the skin of said panel, the stiffener of the first panel extending according to a longitudinal axis of the first panel, the stiffener of the first panel being interrupted, at least one second stiffened panel, said second panel comprising a skin and at least one stiffener, the stiffener of the second panel comprising at least two sole plates attached to one side of the skin of said panel, the stiffener of the second panel extending according to a longitudinal axis of the second panel, the stiffener of the second panel being interrupted, in said aircraft structure, the first panel and the second panel are assembled in such a way that their ends are placed close to each other, thus forming a line of interface, the stiffener of the first panel being opposite the stiffener of the second panel, said stiffeners being substantially aligned according to a direction substantially parallel to the longitudinal axis of the panels, a shroud partially covering the first and second panels, this shroud being on the one hand assembled on the first panel and on the other hand assembled on the second panel, said aircraft structure being characterised in that the structure partially covers at least two sole plates of the stiffener of the first panel and at least two sole plates of the stiffener of the second panel, said structure comprising at least one doubler, said doubler extending along the panels over a distance, according to the longitudinal axes of said panels, at least equal to the distance covered by the shroud according to these longitudinal axes, on either side of the line of interface of said panels, the doubler associated to the stiffener sole plates forming a continuous and regular support surface for the shroud.

BRIEF DESCRIPTION OF THE DRAWINGS

The disclosed embodiments will be better understood after reading the following description and after examining the accompanying figures. These are presented as a rough guide and in no way as a limited guide to the disclosed embodiments. The figures show.

DETAILED DESCRIPTION

Figure 1:
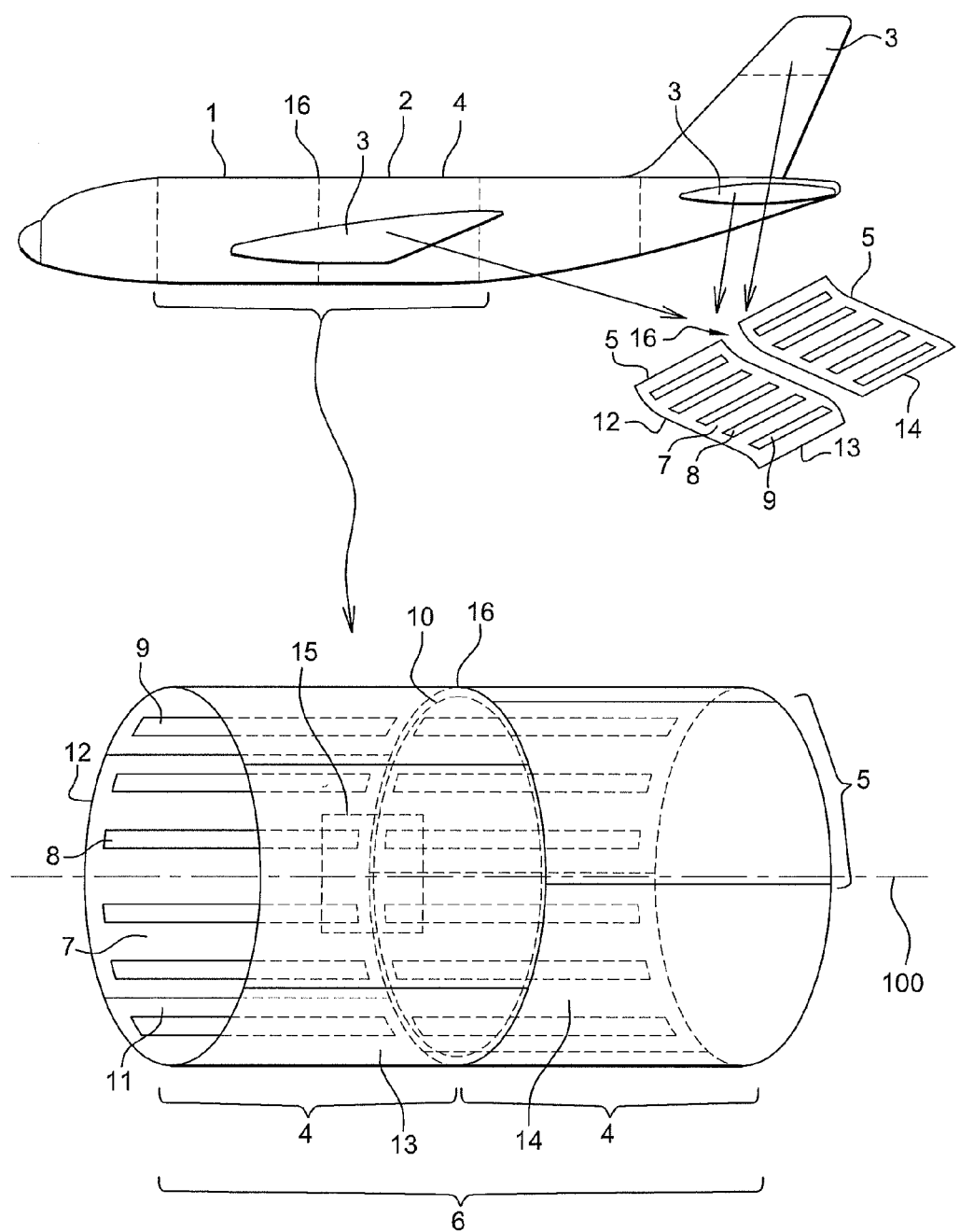
FIG. 1: A profile view of an aircraft with a zoomed image of the elements of the structure comprising the self-stiffened panels.

FIG. 1 represents a profile view of an aircraft with a zoomed image of the elements of the structure comprising the self-stiffened panels. Aircraft 1 comprises a fuselage 2 generally with a structure referred to as a "hull". The detailed description of the disclosed embodiments will, from this point onwards, be applied to the case of the structure of fuselage 2, this case capable of being easily adapted by one of ordinary skill in the art to other structures comprising self-stiffened panels of an aircraft 1.

A fuselage 2 is produced from assembled sections 4 or panels 5. More particularly, these sections 4 or panels 5 are connected between themselves to form the main structure of the fuselage 2.

The wings or even vertical or horizontal tail units can also be produced from panels 5 in the case of an aircraft 1. Moreover, a section 4 can be produced from panels 5 connected between themselves in order to form said section 4. Such a fuselage 2 comprises a part 6 of its structure that is substantially cylindrical as represented on part 6, enlarged in FIG. 1.

In order to obtain the rigid and light characteristics of fuselage 2, panel 5 comprises a coating 7. Such a coating 7, also referred to as skin, is relatively thin. In addition, structural elements 8 are attached to said coating. The structural elements 9 are extended in shape and develop according to a direction substantially parallel to the generators of fuselage 2, also referred to as longitudinal axis 100 of panel 5. These structural elements 9 will hereinafter be referred to as stiffeners 9. Moreover, structural elements 10 develop in a plane substantially perpendicular to the generators of fuselage 2. These structural elements 10 will hereinafter be referred to as frames 10.

In aircraft 1, the stiffeners 9 are generally installed on an internal side of fuselage 2. More particularly, the stiffeners 9 are attached to the skin 7. Said skin 7 is located on an inner wall 11 of the sections 4 or panels 5, i.e. on an inner wall of the fuselage 2.

Stiffeners 9 are generally attached on the skin 7 of a first panel 13 and a second panel 14 before said panel 13 and 14 are assembled together. The stiffeners 9 attached to skin 7 of said panels 13 and 14 are therefore interrupted near to the edges 12 of said panels 13 and 14, also referred to as ends 12 of panels 5. The first panel 13 and the second panel 14 are assembled in such a way that their ends 12 are placed close to each other and form a line of interface 16. However, stiffeners 9 must be substantially aligned from a first panel 13 to the second following panel 14 in order to enable the stresses of stiffener 9 to be transferred from a first panel 13 to stiffener 9 of a second panel 14. In the state of the art, this alignment is practically impossible to achieve with acceptable levels of tolerance for battening the stiffeners without requiring long and expensive procedures.

In this FIG. 1, an area 15 of the assembly can be observed and will be given in more detail in the following figures. This area 15 corresponds to the detailed image of the elements according to the line of interface 16 taken at the junction between the first panel 13 and the second panel 14. The stiffeners 9 are therefore substantially opposite each other on such a line of interface 16.

This FIG. 1 also shows that such lines of interface 16 of panels 5 with stiffeners 6 can exist outside of the fuselage 2, for panels 5 of the vertical or horizontal tail units or for the wings.

Figure 2A:
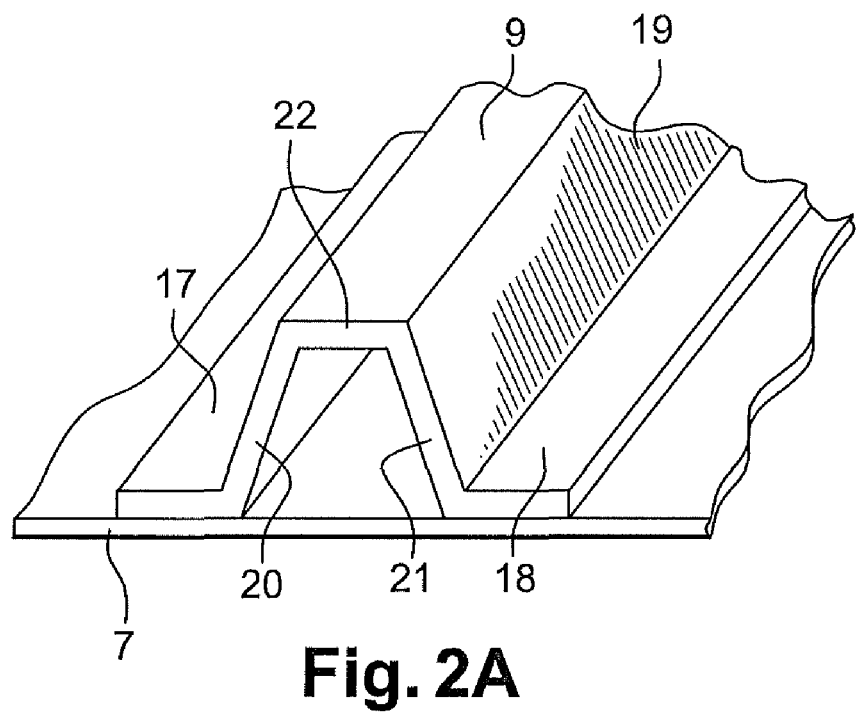
FIGS. 2A and 2B: A representation of two examples of transversal cross-sections of panels comprising the O-shaped stiffeners.
Figure 2B:
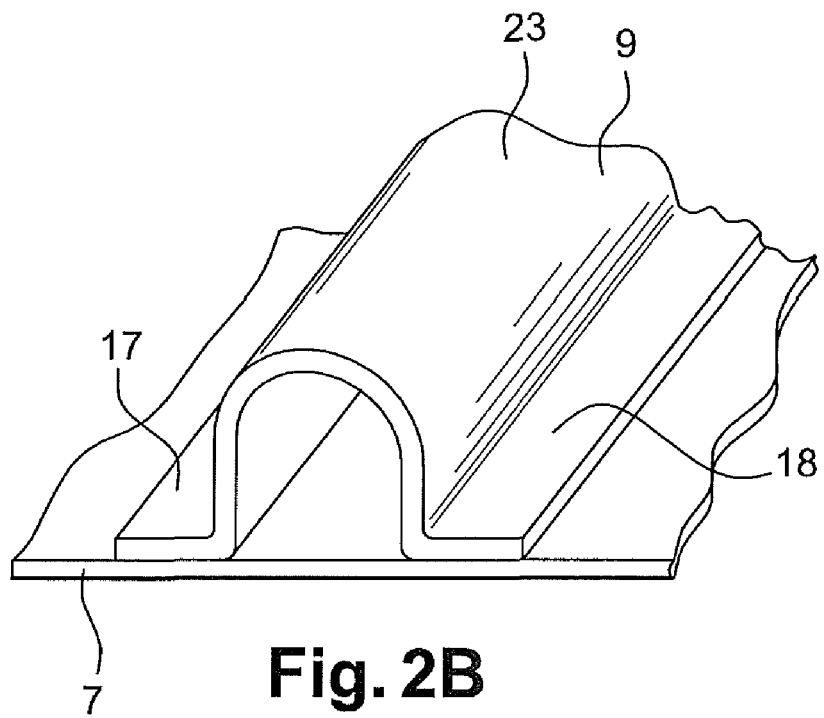

FIGS. 2A and 2B represent two examples of transversal cross-sections of panels comprising the (Ω) omega-shaped stiffeners. A stiffener 9 with a transversal omega-shaped cross-section comprises a first sole plate 17, a second sole plate 18 and a body 19 of stiffener 9. The first sole plate 17 and the second sole plate 18 are located on either side of the body 19. The body 19 connects sole plates 17 and 18 to each other.

In a first mode of embodiment, FIG. 2A, the body 19 comprises a first lateral side 20, referred to as first core 20, and a second lateral side 21, referred to as second core 21, which are connected to the first sole plate 17 and second sole plate 18 respectively. Cores 20 and 21 are connected together via a head 22. Such a head 22 develops in a manner substantially parallel to sole plates 17 and 18. This stiffener 9 is attached to the skin 7. More particularly, stiffener 9 is attached to the skin 7 of panel 5 by its sole plates 17 and 18.

In a second mode of embodiment, FIG. 2B, the omega-shape can be obtained with the presence of the first sole plate 17 and second sole plate 18 connected together by a surface 23 with a rounded cross-section. Such a surface 23 performs the same role as cores 20 and 21 and as head 22 of a stiffener 9 created according to the first mode of embodiment.

Figure 3:
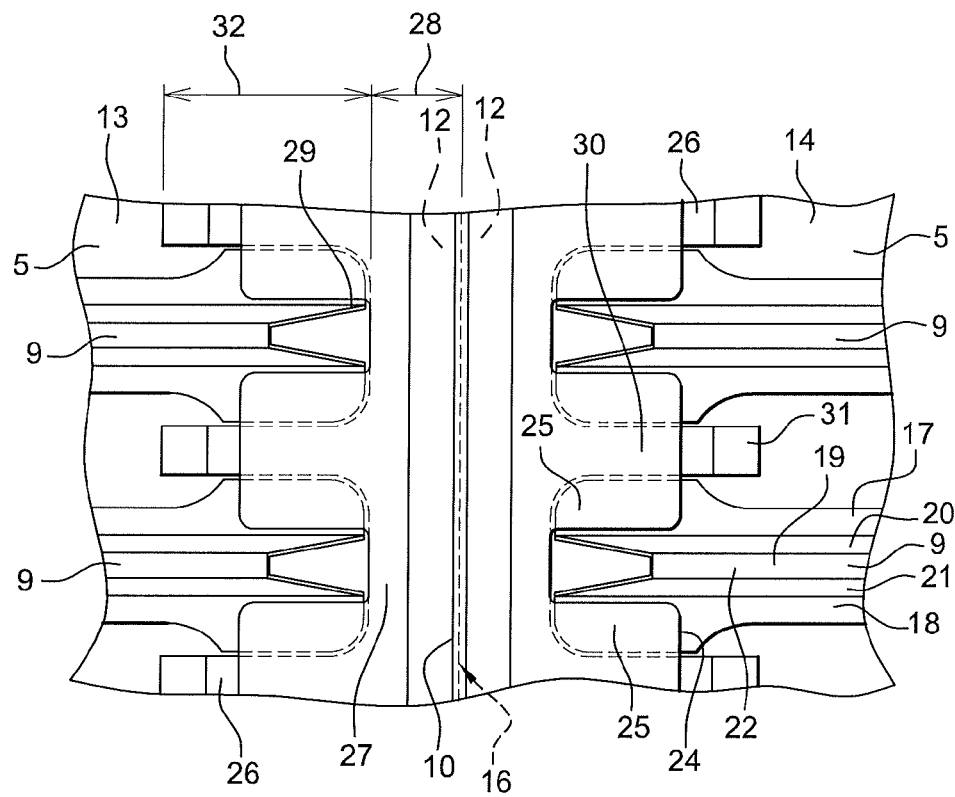
FIG. 3: An overhead schematic view of the junction area of the fuselage panels according to a first mode of embodiment of the disclosed embodiments.

FIG. 3 represents an overhead schematic view of the junction area of the fuselage panels according to a first mode of embodiment of the disclosed embodiments.

This FIG. 3 represents the interface line 16 between the first panel 13 and the second panel 14. Panels 13 and 14 are self-stiffened panels 5. Panels 13 and 14 thus comprise stiffeners 9 as described above. During the assembly operations involving the first panel 13 and the second panel 14, stiffeners 9 of the first panel 13 are located substantially opposite stiffeners 9 of the second panel 14, with respect to the line of interface 16. Thus, from the first panel 13 to the second panel 14, according to a direction parallel to axis 100 of fuselage 2, the stiffeners 9 substantially preserve the same alignment in the fuselage 2 assembly, despite the interruptions.

According to the disclosed embodiments, in order to ensure the continuity of the stresses between the first panel 13 and the second panel 14, a shroud 24 is installed. Such a shroud 24 is assembled on the one hand on the first panel 13 and on the other hand on the second panel 14. In order to lower the stresses being transmitted from panels 13 and 14 to sole plates 17 and 18, cores 20 and 21, in addition to head 22 of stiffeners 9 are progressively stopped before the line of interface 16.

The shroud 24 covers both one part of the first panel 13 and one part of the second panel 14. Such a shroud 24 creates a physical connection between panels 13 and 14. Such a shroud 24 also battens sole plates 17 and 18 of stiffener 9. Thus, the shroud 24 covers the ends 25 of sole plates 17 and 18 of stiffener 9. Advantageously, sole plates 17 and 18 of stiffeners 9 are locally widened according to a direction substantially perpendicular to axis 100, also referred to as the transverse direction with respect to the directions of stiffeners 9. This widened area is located at the ends 25 of each of the sole plates 17 and 18. These widened sole plates 17 and 18 enable the attachments of stiffener 9 to be correctly positioned, despite the possible offset between said stiffeners 9 and the two panels 13 and 14, connected to the manufacturing tolerances. These widened sole plates 17 and 18 thus enable the shroud 24 to batten sole plates 17 and 18 while complying with the distance restrictions between the attachments and the edges of the shroud 24.

According to the disclosed embodiments, on the end 12 of each panel 5, a thickness adjusting element 26 is supported, also referred to as a doubler 26. Such a doubler 26 performs the function of supporting the shroud 24, the doubler 26 extending along a surface area at least equal to the surface area covered by shroud 24, on either side of the line of interface 16 of said panels 13 and 14. According to the longitudinal axes of the panels, parallel to axis 100, doubler 26 extends over a distance at least equal to the distance over which shroud 24 extends. Doubler 26 acts as a regular and continuous support surface for the shroud due to the fact that the surface of the doubler of the side of shroud 24 is in continuity with the free surface of the sole plates of stiffeners 9.

In a first mode of embodiment, doubler 26 is toothed, i.e. doubler 26 has the shape of a fingered plate. Toothed doubler 26 comprises a band 27 that extends along the interface 16 of panels 13 and 14. Parallel to axis 100, this band 27 extends over a distance 28 substantially equal to the distance separating the edge 12 of a panel 5 and an end 29 of stiffeners 9. Moreover, this band 27 extends over the entire width of the panel 5, according to the transverse direction.

Doubler 26 also extends over a surface 30 located between two neighbouring stiffeners 9. At least one edge of doubler 26 is toothed. The toothed edge has at least one extension referred to as foot 31, this foot 31 extending along surface 30. The length 32 of the feet 31, parallel to axis 100, is adapted to the stresses being transmitted from a stiffener 9 of the first panel 13 to stiffener 9 of the second panel 14 located opposite each other, as well as to shroud 24. Typically, length 32 added to length 28 is more than or equal to the length of shroud 24 according to a direction parallel to axis 100. In this manner, doubler 26 acts as a continuous and regular support for shroud 24. The width of feet 31, according to the transverse direction, substantially covers the entire surface 30 of skin 7 between two stiffeners 9 located side by side on the same panel 5.

In this mode of embodiment, feet 31 and band 27 form a single part. The thickness of doubler 26 is such that the support surface formed by sole plates 17 and 18 and by doubler 26 is regular and continuous. Typically, doubler 26 has a thickness substantially equal to the thickness of sole plates 17 and 18.

Moreover, as illustrated in FIG. 3, frames 10 can be attached to shroud 24 at the level of the line of interface 16. More particularly, a frame 10 is attached to shroud 24 at the line of interface 16 between the first panel 13 and the second panel 14. Thus, according to the disclosed embodiments, no opening is created in frame 10 in order to transmit the stresses between a stiffener 9 of the first panel 13 to the second panel 14, these stresses following a stress routing passing underneath said frame 10, between frame 10 and coating 7.

In the first mode of embodiment and in the event of a panel made out of composite material, doubler 26 is advantageously cofired with skin 7. Such a mode of embodiment requires progressive folds.

Figure 4:
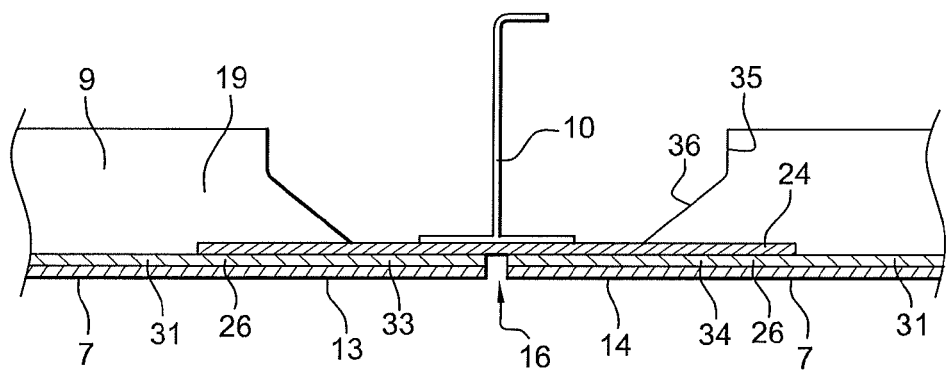
FIG. 4: A cross-section between two side-by-side stiffeners on the foot of the doubler according to this first mode of embodiment of the disclosed embodiments.

FIG. 4 represents a cross-section of the first mode of embodiment of the disclosed embodiments, the cross-section plane being located on a foot of the doubler between two stiffeners 9 located side by side.

The presence of doubler 26 acts as a continuous and regular support at shroud 24. Thus, doubler 26 extends over the entire surface between sole plates 17 and 18 and the two stiffeners 9 located side by side. In this mode of embodiment, the doubler is integrated into the self-stiffened panel before assembling the panels together. Doubler 26 is therefore interrupted at the level of the line of interface 16 of the two panels 13 and 14, by virtue of the nature of the self-stiffened panels.

For a self-stiffened panel made out of composite material, doubler 26 is thus produced from two parts, a first part 33 of doubler 26 cofired with the first panel 13 and a second part 34 of doubler 26 cofired with the second panel 14.

In order to achieve the progressive stop, a slope is created on the body 19 of stiffener 9. This progressive stop can comprise a lip 35 substantially perpendicular to sole plates 17 and 18 for the head 22, and a progressive slope 36 capable for example of being at sloped by approximately 45° for cores 20 and 21.

Figure 5:
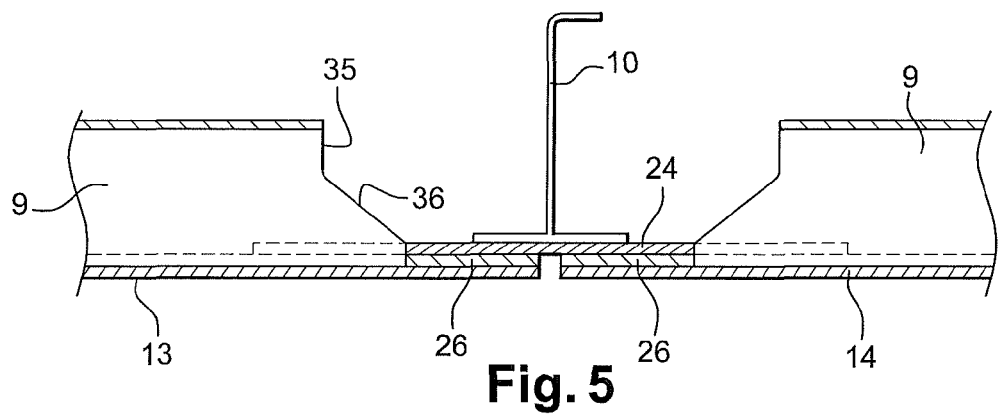
FIG. 5: A cross-section of the panel junction area between the two stiffeners according to this first mode of embodiment of the disclosed embodiments.

FIG. 5 represents a cross-section of this first mode of embodiment of the disclosed embodiments, the cross-section plane being a plane of symmetry of a stiffener. Between the two stiffeners 9 of a first and second panel (13, 14), the interruption of the doubler 26 is located near to the interruption of sole plates 17 and 18. This proximity is such that only the clearances required by the assembly tolerances are present between the doubler 26 and sole plates 17 and 18. The progressive stop of the head 19, having led to the distribution of the stress in sole plates 17 and 18, the interruption of doubler 26 must be such that the stresses can easily pass from sole plates 17 and 18 to doubler 26 and from doubler 26 to shroud 24.

Figure 6:
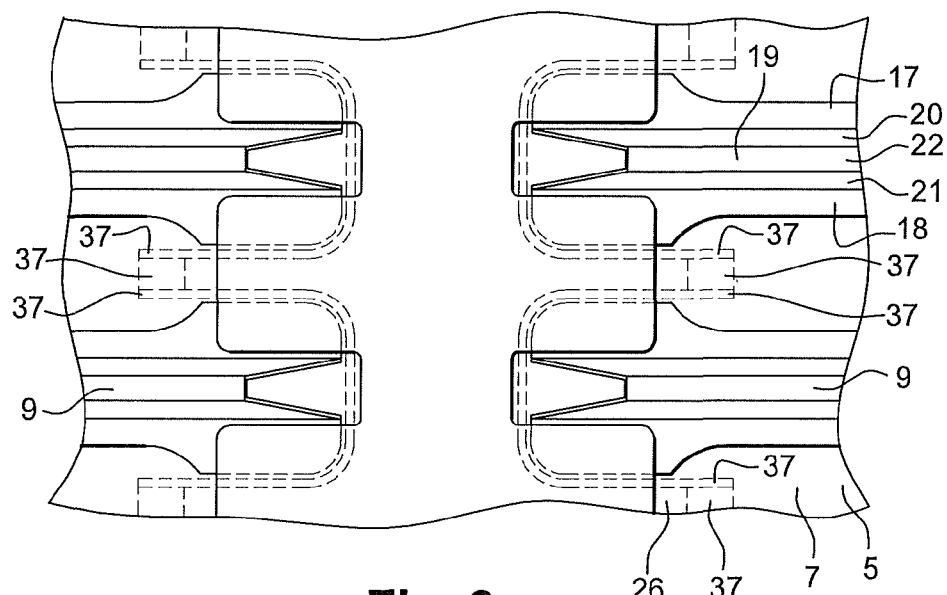
FIG. 6: An overhead schematic view of the junction area of the fuselage panels according to a second mode of embodiment of the disclosed embodiments.

FIG. 6 represents an overhead schematic view of the junction area of the fuselage panels according to a second mode of embodiment of the disclosed embodiments. According to this second mode of embodiment of the disclosed embodiments, doubler 26 is integrated into the skin 7. More particularly, the doubler is thus located inside the skin 7 of a panel 5. Such an insertion of doubler 26 to skin 7 of a panel 5 causes a variation in the level of the surface of skin 7, shroud 24 thus being directly attached to skin 7.

For a self-stiffened panel 5 made out of composite material, doubler 26 is advantageously cofired in the layers of the panel. Such a doubler causes the formation of layers and slopes 37 of said skin 7.

Figure 7:
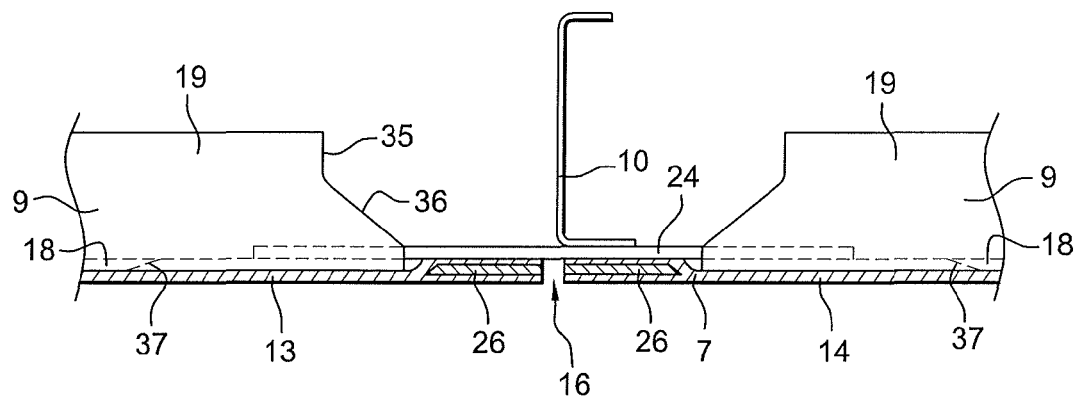
FIG. 7: A cross-section between two stiffeners according to this second mode of embodiment of the disclosed embodiments.

FIG. 7 represents a cross-section of the panels between two stiffeners located side by side according to this second mode of embodiment of the disclosed embodiments. Doubler 26 is integrated into the skin 7. As for the first mode of embodiment of the disclosed embodiments, doubler 26 is interrupted by the line of interface 16 of the first panel 13 and of the second panel 14.

Figure 8:
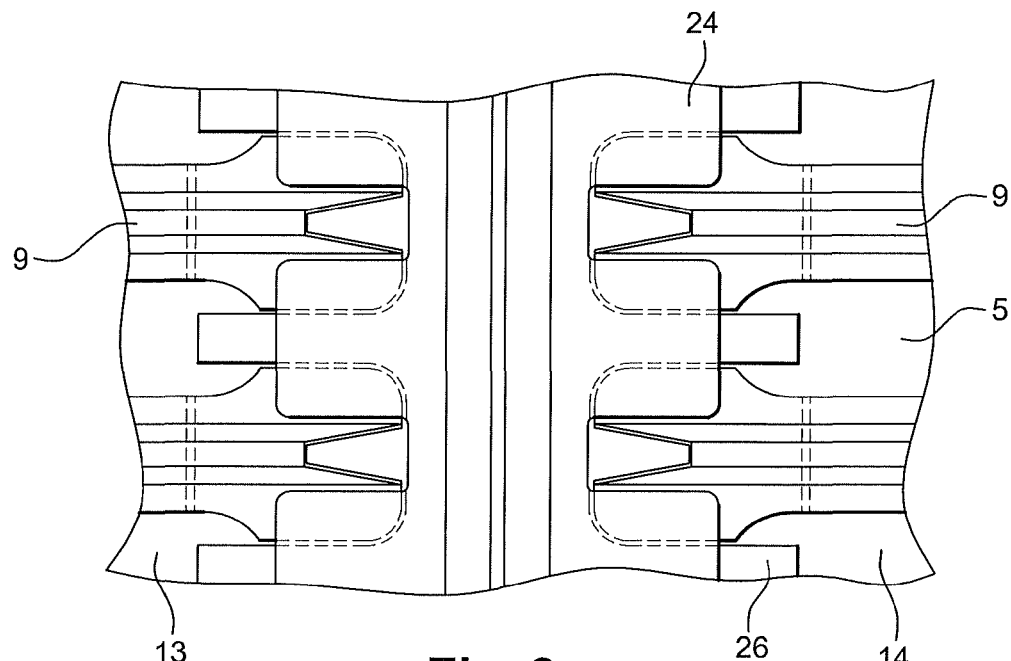
FIG. 8: An overhead schematic view of the junction area of the fuselage panels according to a third mode of embodiment of the disclosed embodiments.

FIG. 8 represents an overhead schematic view of the junction area of the fuselage panels according to a third mode of embodiment of the disclosed embodiments. In contradiction to the two first modes of embodiment where doubler 26 was integrated in panels 5, doubler 26 is an insert, i.e. manufactured independently from panels 5. This doubler insert is installed during the assembly operations assembling panels 13 and 14 together. Moreover, doubler insert 26 is not interrupted by the line of interface 16 between the first panel 13 and the second panel 14.

By virtue of its continuity, doubler 26 transfers the stresses from stiffener 9 of the first panel 13 to stiffener 9 of the second panel 14 located opposite each other. This transfer of stresses takes place in the same manner as the transfer of stresses performed by shroud 24.

In a variation of the disclosed embodiments according to this mode of embodiment, doubler 26 is integrated into shroud 24. Such a doubler 26 integrated into the shroud simplifies the operations for assembling panels 5 together. Such a part can be produced, for example, using thermosealed thermoplastic parts.

Figure 9:
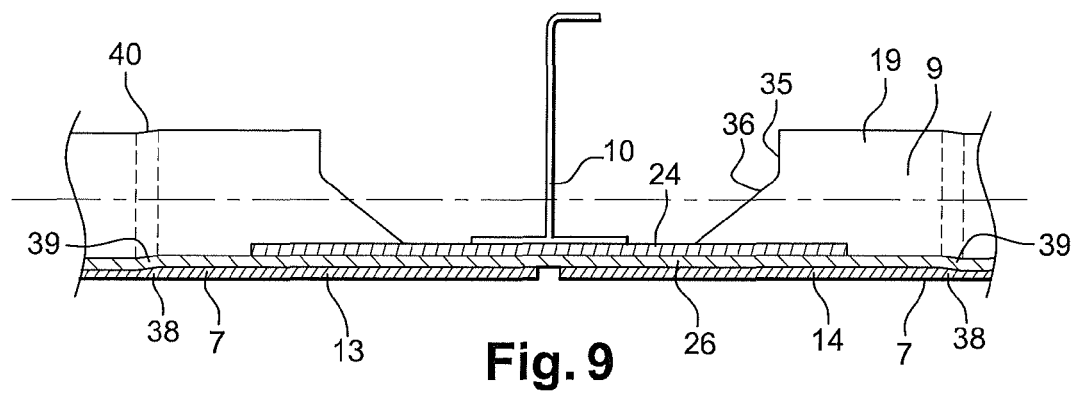
FIG. 9: A cross-section between two stiffeners according to this third mode of embodiment of the disclosed embodiments.

FIG. 9 represents a cross-section of the panels between two stiffeners located side by side according to this third mode of embodiment of the disclosed embodiments. Doubler 26 is continuous despite the line of interface 16. In order to lower the stresses from stiffener 9 into shroud 24, skin 7 is locally thickened. More particularly, skin 7 is thickened just before the battening area, i.e. the thickening of skin 7 is located on a part of panel 5 beginning at the edge 12 of said panel 5 and stopping further away from the line of interface than end 25 of sole plates 17 and 18. The thickening 38 of skin 7 causes doubler 26 to be raised 39. Moreover, this thickening 38 causes stiffener 9 to be raised 40. Stiffeners 9 are produced to adopt the shape of the panel in such sloping areas.

Figure 10:
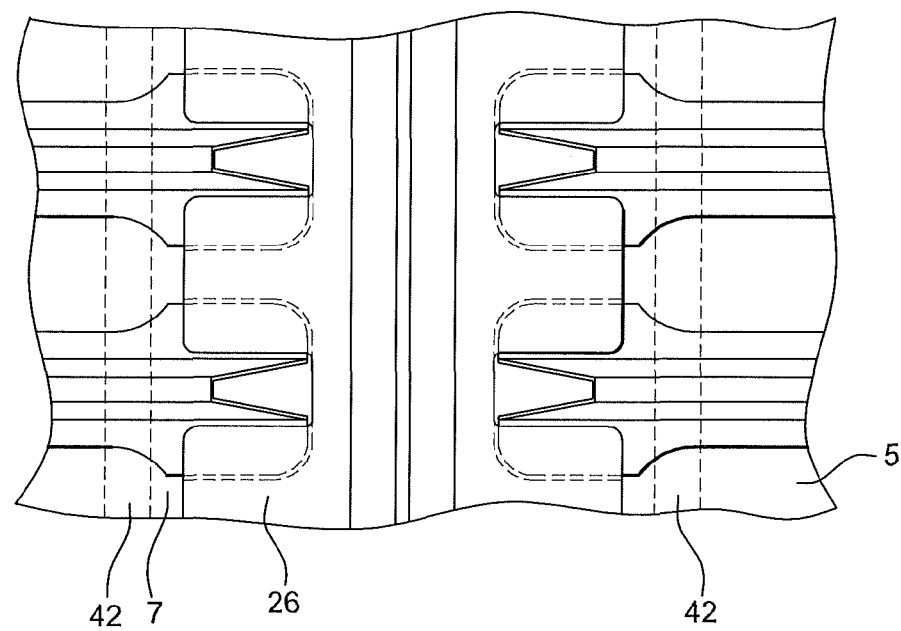
FIG. 10: An overhead schematic view of the junction area of the fuselage panels according to a fourth mode of embodiment of the disclosed embodiments.

FIG. 10 represents an overhead schematic view of the junction area of the fuselage panels according to a fourth mode of embodiment of the disclosed embodiments. In this mode of embodiment of the disclosed embodiments, doubler 26 is not an independent part. In fact, in this fourth mode of embodiment, the function performed by doubler 26 in the first three modes of embodiment is directly performed by skin 7. Skin 7 is thus thickened in order to act as doubler 26.

For a panel 5 made out of composite material, skin 7 is subjected to significant folding 42 from the edge 12 of panel 5 to an area further away from the edge of panel 5 than the beginning of the battening area. The folding 42 of skin 7 is similar to that described in the third mode of embodiment, however in this instance, the folding 42 in skin 7 of panel 5 is significant enough to act as doubler 26.

Figure 11:
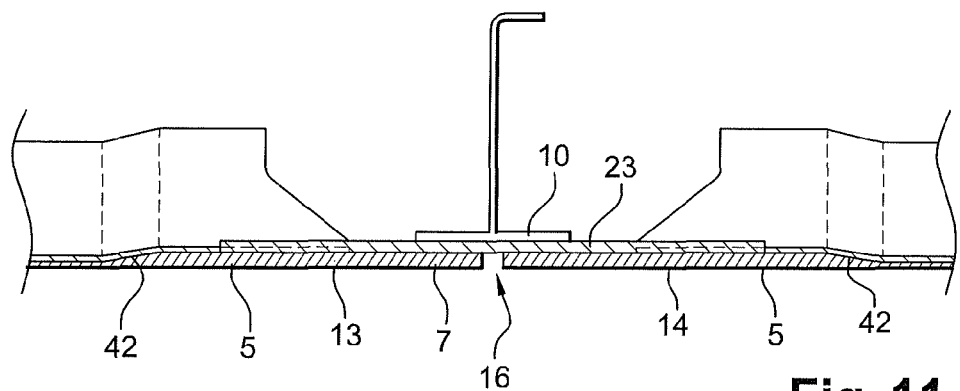
FIG. 11: A cross-section between two stiffeners according to this fourth mode of embodiment of the disclosed embodiments.

FIG. 11 represents a cross-section between two stiffeners according to this fourth mode of embodiment of the disclosed embodiments. A thickness of skin 7 according to this mode of embodiment requires the role of the doubler 26 to be interrupted by the line of interface 16 as is the case for a doubler 26 integrated into the skin 7 of panel 5.

Figure 12:
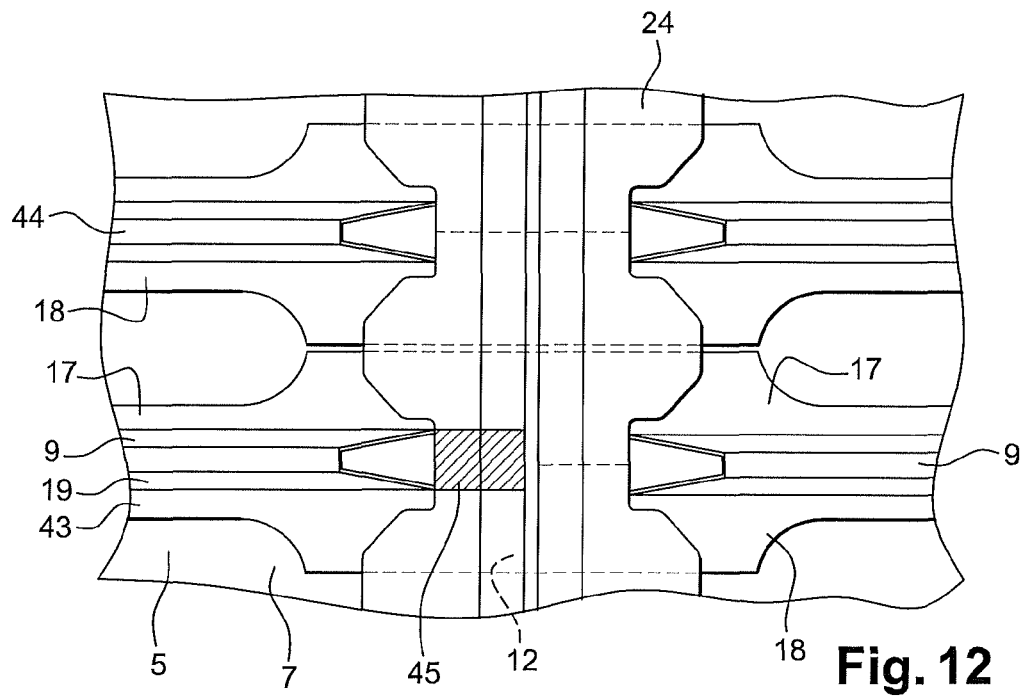
FIG. 12: An overhead schematic view of the junction area of the fuselage panels according to a fifth mode of embodiment of the disclosed embodiments.

FIG. 12 represents an overhead schematic view of the junction area of the fuselage panels according to a fifth mode of embodiment of the disclosed embodiments. In such a mode of embodiment of the disclosed embodiments, the role of the doubler is performed by sole plates 17 and 18 of the neighbouring stiffeners 9. In order to achieve this, sole plates 17 and 18 are widened, according to the transverse direction with respect to an axis of the stiffeners, so that their edges are in immediate proximity to each other. Typically, a first sole plate 17 of a first stiffener 43 is locally widened according to the transverse direction. In addition, a second sole plate 18 of a second stiffener 44, the first stiffener 33 neighbouring the second stiffener 44, is locally widened according to the transverse direction. This widening of sole plates 17 and 18 is such that the edge of the first sole plate 17 of the first stiffener 43 is in immediate proximity to the edge of the second sole plate 18 of the second stiffener 44, these two sole plates being separated only by the clearances required by the assembly tolerances. In the areas where stiffeners 43 and 44 are too distant from each other, in such a way that the sole plates should not be widened, this mode of embodiment can be combined with one of the other modes of embodiment previously described. The modes of embodiment of the disclosed embodiments can, as a general rule, be combined together.

Moreover, sole plates 17 and 18 are also extended according to a direction substantially parallel to axis 100. In contradiction with the head of stiffener 9, the sole plates extend up to the edge 12 of panel 5. In addition, sole plates 17 and 18 extend according to the transverse direction in order to cover the surface 45 of skin 7 located between the edge 12 of panel 5 and the interruption of the heads 19 of stiffeners 9.

The shroud 24 is thus directly supported by sole plates 17 and 18 of stiffeners 9 and by doublers 26 added as required. The transverse widening of sole plates 17 and 18 having covered surface 45 of skin 7 between heads 19 of stiffeners 9 and the edge 12 of the panel can be avoided by locally integrating doublers 26 covering said surface 45 of skin 7. The purpose of these doublers 26 is thus to provide a regular and continuous support for shroud 24.

Figure 13:
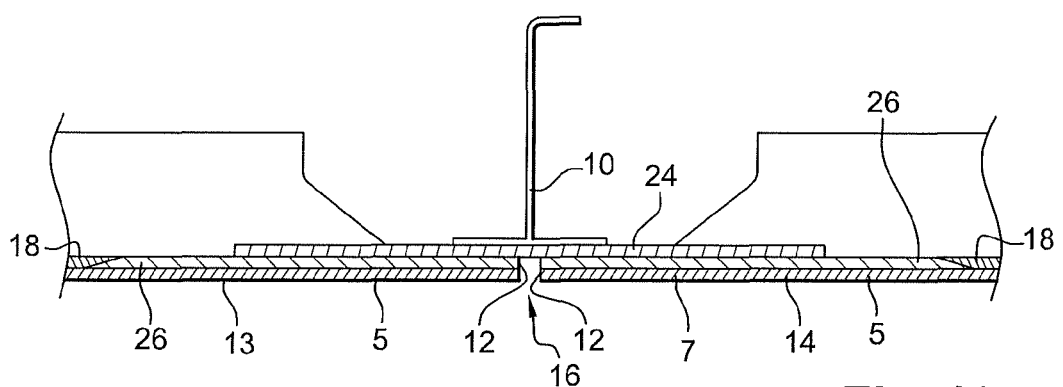
FIG. 13: A cross-section between two stiffeners according to this fifth mode of embodiment of the disclosed embodiments.

FIG. 13 represents a cross-section between two stiffeners according to this fifth mode of embodiment of the disclosed embodiments. The advantage presented by this last mode of embodiment is that no additional part is required in the fuselage 2 in order to perform the role of the doubler 26. However, doubler 26, i.e. the widened and extended sole plates 17 and 18 of stiffeners 9 in this mode of embodiment, is interrupted at the edge 12 of panels 5.

The invention claimed is:

1. An aircraft structure comprising
a first stiffened panel, said first panel comprising a skin and at least one stiffener,
the stiffener of the first panel comprising at least two sole plates attached to one side of the skin of said panel, referred to as the internal side,
the stiffener of the first panel extending according to a longitudinal axis of the first panel,
the stiffener of the first panel being interrupted near to one end of said first panel,
at least one second stiffened panel, said second panel comprising a skin and at least one stiffener,
the stiffener of the second panel comprising at least two sole plates attached to one side of the skin of said panel, referred to as the internal side,
the stiffener of the second panel extending according to a longitudinal axis of the second panel,
the stiffener of the second panel being interrupted near to one end of said second panel,
the first panel and the second panel are assembled in such a way that their ends are placed close to each other and form a line of interface,
the stiffener of the first panel is opposite the stiffener of the second panel, said stiffeners being substantially aligned according to a direction substantially parallel to the longitudinal axes of the panels,
a shroud partially covering the first and second panels, said shroud being on the one hand assembled on the first panel and on the other hand assembled on the second panel,
said aircraft structure being wherein:
the structure partially covers at least two sole plates of the stiffener of the first panel and at least two sole plates of the stiffener of the second panel,
said structure comprises at least one doubler, said doubler extending along the panels over a distance, according to the longitudinal axes of said panels, at least equal to the distance covered by the shroud according to these longitudinal axes, on either side of the line of interface of said panels,
the doubler associated to the sole plates of the stiffeners forms a continuous and regular support surface for the shroud.

2. A structure according to claim 1, wherein at least one stiffener is sloped at least one interrupted end.

3. A structure according to claim 1, wherein the doubler comprises:
a central band extending locally over an entire inner surface of the panels located between one end of the stiffeners interrupted by a panel junction and an edge of said panels,
at least one toothed edge with extensions, referred to as feet, said feet extending parallel to the longitudinal axis of the panels between the stiffeners, said feet having dimensions such that they cover a surface substantially extending over the entire inner surface of the skin between two neighbouring stiffeners of the same panel.

4. A structure according to claim 1, wherein the doubler is attached to the skin of the panels.

5. A structure according to claim 1, wherein the panels are made out of composite material, and that the doubler is made out of composite material and cofired with the skins of the panels.

6. A structure according to claim 1, wherein the panels are made out of composite material and that the doubler is bonded to the skin.

7. A structure according to claim 1, wherein the sole plates of the stiffeners extend and are widened to the ends of the stiffeners, said sole plates thus forming the doubler.

8. A structure according to claim 1, wherein:
   the doubler is integrated between the folds of skin of the panels, the doubler thus locally forming an additional thickness of the skin,
   the additional thickness of the skin caused by the doubler associated to the sole plates of the stiffeners forms a continuous and regular support surface for the shroud.

9. A structure according to claim 1, wherein the skin of the panels is locally thickened at edges of the panels, this thickening thus constituting the doubler.

10. A structure according to claim 1, wherein the doubler is integrated into the shroud.

* * * * *

UNITED STATES PATENT AND TRADEMARK OFFICE
CERTIFICATE OF CORRECTION

PATENT NO. : 8,215,584 B2                                              Page 1 of 1
APPLICATION NO. : 12/738600
DATED : July 10, 2012
INVENTOR(S) : Cazeneuve et al.

It is certified that error appears in the above-identified patent and that said Letters Patent is hereby corrected as shown below:

Column 10, line 46, Claim 2, after sloped insert -- at --, therefor.

Signed and Sealed this
Eighteenth Day of September, 2012

David J. Kappos
*Director of the United States Patent and Trademark Office*